United States Patent [19]
Lovercheck

[11] 4,203,107
[45] May 13, 1980

[54] MICROCOMPUTER TERMINAL SYSTEM HAVING A LIST MODE OPERATION FOR THE VIDEO REFRESH CIRCUIT

[75] Inventor: Lawrence R. Lovercheck, Palo Alto, Calif.

[73] Assignee: Zentec Corporation, Santa Clara, Calif.

[21] Appl. No.: 958,714

[22] Filed: Nov. 8, 1978

[51] Int. Cl.$^2$ .................. G06K 15/20
[52] U.S. Cl. .................. 340/799; 340/711; 340/709; 340/744; 364/900
[58] Field of Search .................. 340/798, 799; 364/900

[56] References Cited

U.S. PATENT DOCUMENTS

| | | | |
|---|---|---|---|
| 3,685,038 | 8/1972 | Flanagan | 340/799 X |
| 3,685,039 | 8/1972 | Flanagan | 340/799 X |
| 3,946,407 | 3/1976 | Ishii et al. | 340/799 X |
| 3,972,026 | 7/1976 | Waitman et al. | 364/900 |
| 4,074,254 | 2/1978 | Belser et al. | 364/900 |
| 4,103,331 | 7/1978 | Thacker | 340/799 X |
| 4,104,624 | 8/1978 | Hamada | 340/799 X |
| 4,115,765 | 9/1978 | Hartke | 340/799 X |
| 4,141,003 | 2/1979 | Felsenstein | 340/799 |

*Primary Examiner*—David L. Trafton
*Attorney, Agent, or Firm*—Jack M. Wiseman

[57] ABSTRACT

A microcomputer terminal system having a list mode of operation for the video refresh circuit. Stored in the main memory are list address pointers. Video circuits read a list address pointer at a designated location in the main memory. The list address pointer points the video circuits to the beginning of a list. The main memory stores the list. The list comprises control data, character count and a data address pointer. The data address pointer of the addressed list is read by the video circuits. By reading the data address pointer of the addressed list, the video circuits are pointed to the storage location of the main memory for the character data to be displayed on the video screen. On each refresh cycle of the video screen, the video circuits progress element-by-element through the list generating the display. The video circuits return to the beginning of the addressed list for the next refresh cycle.

14 Claims, 12 Drawing Figures

MICROCOMPUTER TERMINAL SYSTEM HAVING A LIST MODE OPERATION FOR THE VIDEO REFRESH CIRCUIT

BACKGROUND OF THE INVENTION

The present invention relates in general to microcomputer terminal systems, and more particularly to a microcomputer terminal system having a list mode of operation for the video refresh circuit.

In the patent to Lovercheck et al., U.S. Pat. No. 3,973,244, issued on Aug. 3, 1976, for a Microcomputer Terminal System, there is disclosed a microcomputer terminal system having a video refresh circuit. The microprocessor writes character and control information into the video refresh segment of the main memory. Video circuits repeatedly read this information out of the memory devices to determine the location of the character to be displayed on the video screen and to enter a composite video signal on the video screen.

It has been known that the main memory of a terminal for microcomputers included programs for execution by the microprocessor, character data and control data. The control data designates the location of the character data in the memory, the location on the video screen for displaying the character data and the visual effects or video attributes of the displayable character data. The video circuits read the control data in the main memory and caused the display of the character data on the video screen with the designated visual effects or video attributes. This operation was performed each time the video display was refreshed.

In the Zentec Corporation Microcomputer Terminal System 9003, the main memory stored in contiguous locations display data. The data portion of the video screen thereof included 1920 characters and the data storage of the main memory stored 2 screens of characters. At the beginning of each refresh cycle, the video circuits read an address pointer in the memory, which indicated the starting line number within the 2 screen area of the memory. The address pointer designated the start address of the 1920 characters to be displayed contiguously on the video screen. The Terminal System 9003 required the video attribute codes to be included in the display data at the position they were to take effect on the video screen. The position on the video screen equated to the attribute position in the data was displayed as a single character blank.

The Terminal System 9003 video screen required 1920 locations in the main memory, although less than 1920 characters were being displayed. The video attribute changes required a single character blank space at the location of each change on the video screen. The video areas of the main memory were restricted to two screens.

The Terminal System 9003 with background attributes enabled video attribute changes without taking a space on the screen. The displayable video area of the main memory was equivalent to the first screen area of the Terminal System 9003 without background attributes and occupies 1920 contiguous locations in the main memory. The second screen area of the main memory was used solely for video attribute codes. The relative location of any video attribute in the second screen area of the main memory was the same as the relative location of its associated displayable data in the first screen area. Thus, for each displayable character there was an equivalent video attribute code. On each refresh cycle of the video screen, the data characters were presented to the character generator to obtain the appropriate dot matrix on the video screen, and the video attribute codes were presented parallel to the video attribute control circuits. Hence, a video screen required 3840 locations in the main memory. 1920 were required for the displayable data and 1920 for the attributes. These locations were required in the main memory whether or not a fewer number of characters were actually displayed on the screen and whether or not a lesser number of attribute changes were made.

Heretofore, video display apparatus employed a link-list, data-encoding system for refreshing a video display. Each block of data stored in a terminal memory included a two-character link that points to successive data blocks or the memory address of the next character to be retrieved. Such apparatus has been disclosed in the patent to Waitman et al., U.S. Pat. No. 3,972,026 issued on July 27, 1976, for Linked List Encoding Method And Control Apparatus For Refreshing A Cathode Ray Tube Display, and the patent to Lyman et al., U.S. Pat. No. 4,047,248, issued on Sept. 6, 1977, for Linked List Data Encoding Method And Control Apparatus For A Visual Display.

In the patent to Koster, U.S. Pat. No. Re. 28,238, reissued on Nov. 12, 1974, there is disclosed a control and display apparatus for a digital data processing system. A table link-up operation is initiated to determine the starting address for a page to be displayed. Characters are formed by display vectoring.

The patent to Hogal et al., U.S. Pat. No. 3,886,585, issued on Dec. 7, 1976, for Video Generator Circuit For A Dynamic Digital Television Display, discloses a video generator circuit and video refresh circuits. Data is stored in the refresh buffer in 16 bits per slot. Each slot has a pointer field that contains the address of another slot. A group of slots are threaded together into a list. The lists are accessed by a table of pointers.

Other patents of interest are:

Dumstorff et al. U.S. Pat. No. 3,789,367; Boyd, U.S. Pat. No. 3,744,033; Cuccio, U.S. Pat. No. 3,543,244.

SUMMARY OF THE INVENTION

A microcomputer terminal system having a list mode of operation for the video refresh circuit. Stored in the main memory are list address pointers. The list address pointer points the video circuit reading it to the beginning of a list stored in the main memory. The list includes a data address pointer among other elements. The video circuit reads the data address pointer of the addressed list for the location of the character data stored in the main memory to be displayed on the video screen. On each refresh cycle of the video screen, the video circuits progress element-by-element through the list generating the display. The video circuits return to the beginning of the addressed list for the next refresh cycle.

By virtue of the present invention, display data need not be contiguous in the memory, although the display data appears contiguous on the video screen. A line of character data, on the video screen, when displaying less than 80 characters, need not require 80 locations for storage in the memory. Video data can be displayed from any storage area in the memory. Video attributes appear in the data, but do not take a blank space on the video screen. Control codes are embedded in the character data without being required to be displayed on the screen.

If the application uses a short line for display on the video screen, the need for blank spaces on the video screen and the corresponding location in the memory has been obviated.

By various coding in the control character, the video circuits perform the following operations:

(a) Display data as double width on the screen;

(b) Automatically fill out the remainder of a partially defined line with blanks;

(c) Go to the next element in the designated list for the remainder of a partially defined line.

During the list driven video process, the video circuits examine the displayable data stream for special codes. If any of the special codes are encountered, the code is discarded, but modifies the action taken on the next character in the data stream. The modified actions are as follows:

(a) Treat the next character in the usual manner;

(b) Display the next character as a blank;

(c) Discard the next character;

(d) Decode the next character as a video attribute.

By virtue of this arrangement, not only are video attributes processed, but also it provides text editing applications in which format data, such as end of paragraph, end of page and the like, may be imbedded in the text without being required to be displayed.

DESCRIPTION OF THE PREFERRED EMBODIMENT

Figure 1:
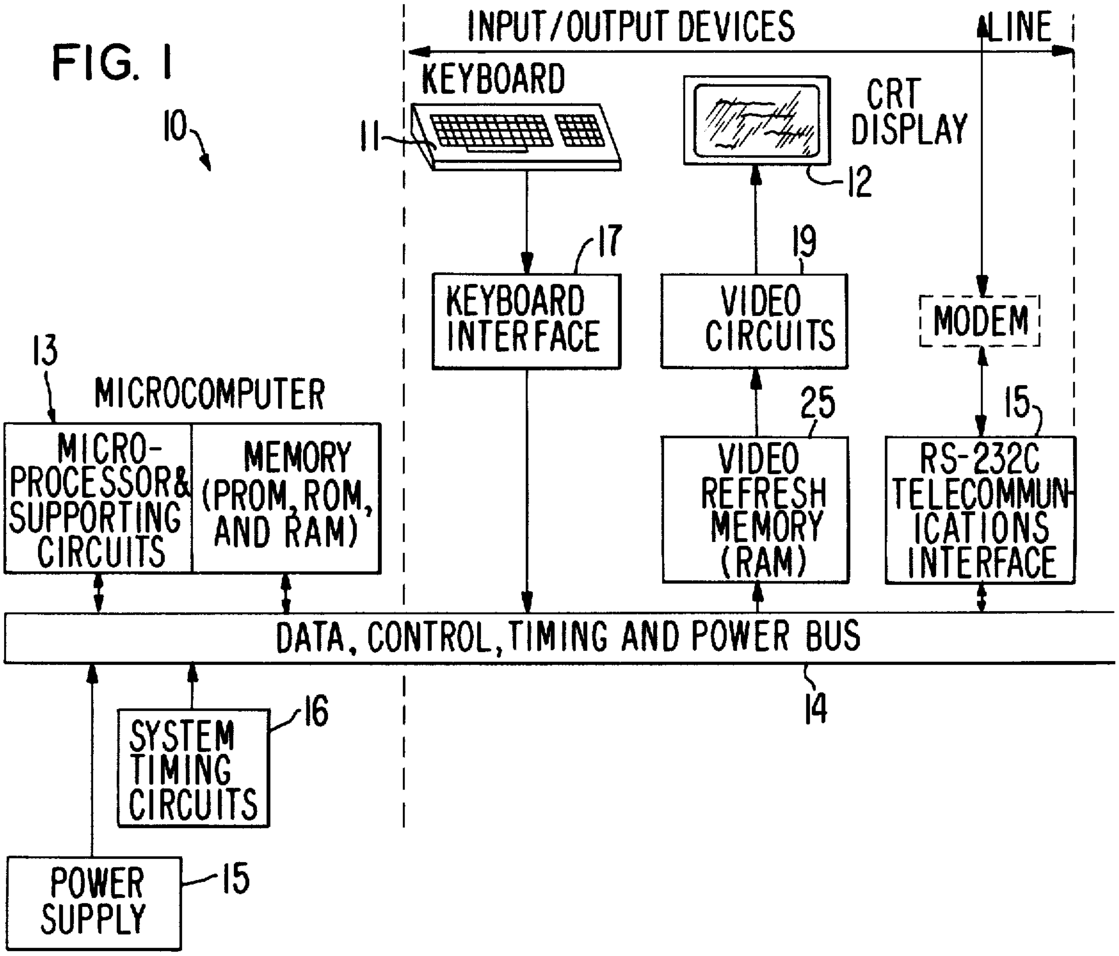
FIG. 1 is a diagrammatic illustration of a microcomputer terminal system embodying the present invention.

Illustrated in FIG. 1 is a microcomputer terminal system 10 embodying the present invention. The microcomputer terminal system is of the type disclosed in detail in the patent to Lovercheck et al., U.S. Pat. No. 3,973,244, issued on Aug. 3, 1976.

Briefly, the microcomputer terminal system 10 comprises a keyboard 11; a video display, such as a cathode ray tube display 12; and a microcomputer 13. As shown in FIG. 1, the microcomputer 13 includes a microprocessor, timing and control circuits, and in addition, ROM/PROM and RAM memory. It is well-known in the art that a microprocessor, such as the microprocessor 13, handles 8 bit words, and addresses 64 K bytes of memory. The microprocessor 13 is connected to data input/output bus 14. The keyboard 11, the video display 12 and the telecommunication electronics 15 are also connected to the bus 14. Also connected to the bus 14 are the power supply 15 and the system timing circuits 16.

The microcomputer memory includes a read-only segment (ROM) which stores the system operating programs. It also includes a read/write segment (RAM) which stores the video display information that is repeatedly read out of the memory to refresh the video display 12.

The keyboard 11 is connected to the bus 14 through a keyboard interface circuit 17. The video display is connected to the bus 14 through a video circuit 19 and a read/write memory 25. As is well-known in the art, interface circuits serve to change data signals to a compatible form with the memory or microprocessor.

The video display 12 employs 60 complete images or frames every second. This rate eliminates undesirable effects of flicker on the screen. The entire screen is scanned at least once every 60th of a second. During the interval comprising one vertical frame, the entire area of the monitor screen must be scanned from left to right, beginning at the upper edge of the screen and proceeding downward. The screen is scanned horizontally approximately 265 times during each vertical frame. The horizontal scanning circuitry has to be driven at approximately 15.9 K Hz (265×60). A picture includes intervals during which the screen is blank. These intervals include the time during which the beam is returned to the left side of the screen at the end of each horizontal line (horizontal retrace), as well as the interval during which the beam travels from the bottom of the screen back to the top of the screen (vertical retrace). To create the picture effect, the scanning beam is turned on and off during the horizontal scan. To maintain adequate resolution, a minimum video bandwith of approximately 15 MHz is necessary for a readable display.

A vertical frame consists of 265 individual scan lines. There are 250 lines to be divided among the 25 rows of the display. Each line of text on the screen will consist of 10 individual scan lines. Each of the 80 character columns will consist of 10 individual bits. There are 80 columns in the visible portion of each horizontal line. The characters within the line recur at a rate slightly in excess of 1.5 MHz. The 10 individual bits that make up each line within the character recur at 10 times that rate or approximately 15.58 MHz.

Figure 2:
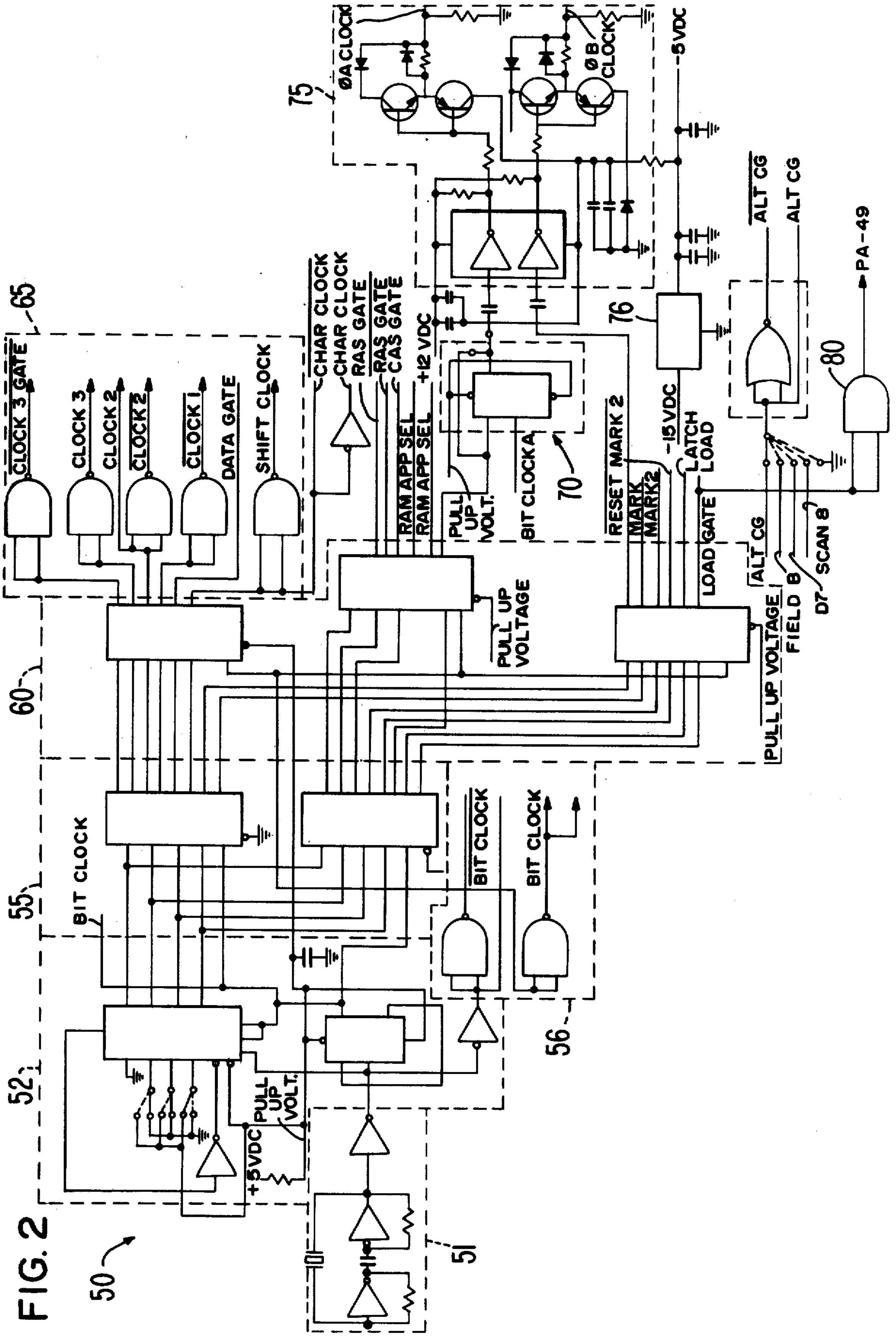
FIG. 2 is a schematic diagram of the system timing circuits employed in the microcomputer terminal system shown in FIG. 1.

Illustrated in FIG. 2 is a timing circuit 50. The timing is initiated by a suitable crystal oscillator 51, which has an output of 15.58 MHz. The oscillator 51 comprises a 15.58 MHz crystal and a capacitively coupled two-stage amplifier. The resistors damp the high gain of the inverters. These cascaded stages act as a linear feedback amplifier to sustain oscillations in the crystal. Connected to the output of the oscillator 51 is a suitable divide by 30 five-stage counter 52 to reduce the bit clock frequency. The bit clock output from the counter circuit 52 is applied to a programmable read-only memory 55. Additionally, the bit clock pulses produced in the output of the oscillator circuit 51 are applied through inverter gates 56. It is the bit clock pulse output from the gates 56 that determines the element width with each character displayed on the video display 12.

Figure 3A:
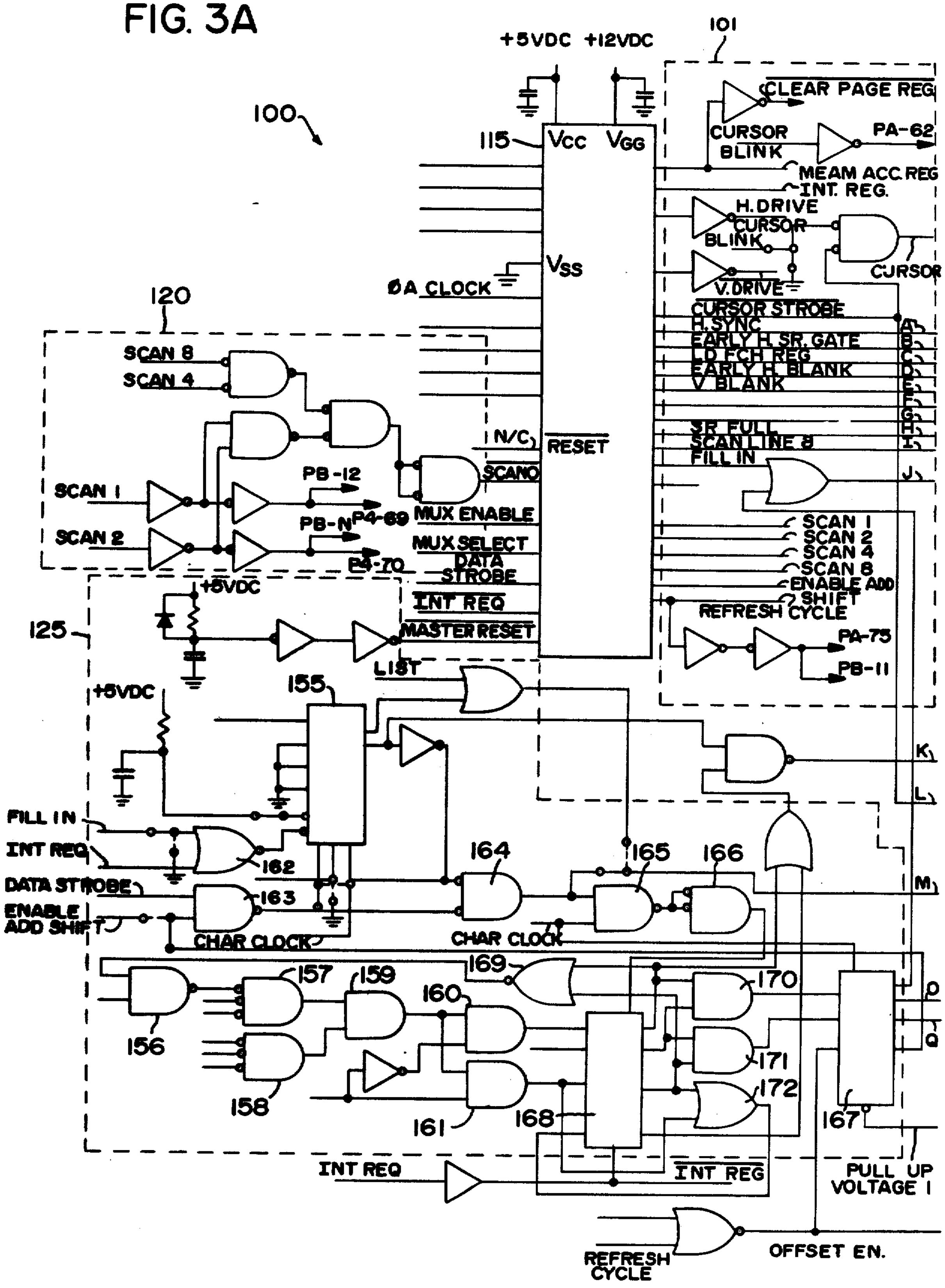
FIGS. 3A and 3B are a schematic diagram of the video refresh circuit employed in the microcomputer terminal system shown in FIG. 1.

The timing signals from the read only memory 55 are latched by a latching circuit 60 for retaining the data from the read-only memory 55. In turn, the output of the latching circuit 60 is applied to driver circuit 65 for application over the system bus 14. The driver circuit 65 output includes the shift clock pulses, which drive a divide-by-98 line counter 150 (FIG. 6) which is part of a direct memory access circuit 115 (FIG. 3A). The divide-by-98 line counter 150 determines the length of the horizontal line. Also, the output of the driver circuit 65 includes clock 1, clock 2 and clock 3 pulses. These clock pulses drive the read, write and refresh circuitry of the read/write memory 25 which is used both as a video buffer and as a general purpose working storage in the terminal system. The clock 1, clock 2, and clock 3 signals are employed in synchronizing operations throughout the terminal system. They control the timing of the CPU bus requests, memory refresh requests, and the video refresh requests.

Figure 6:
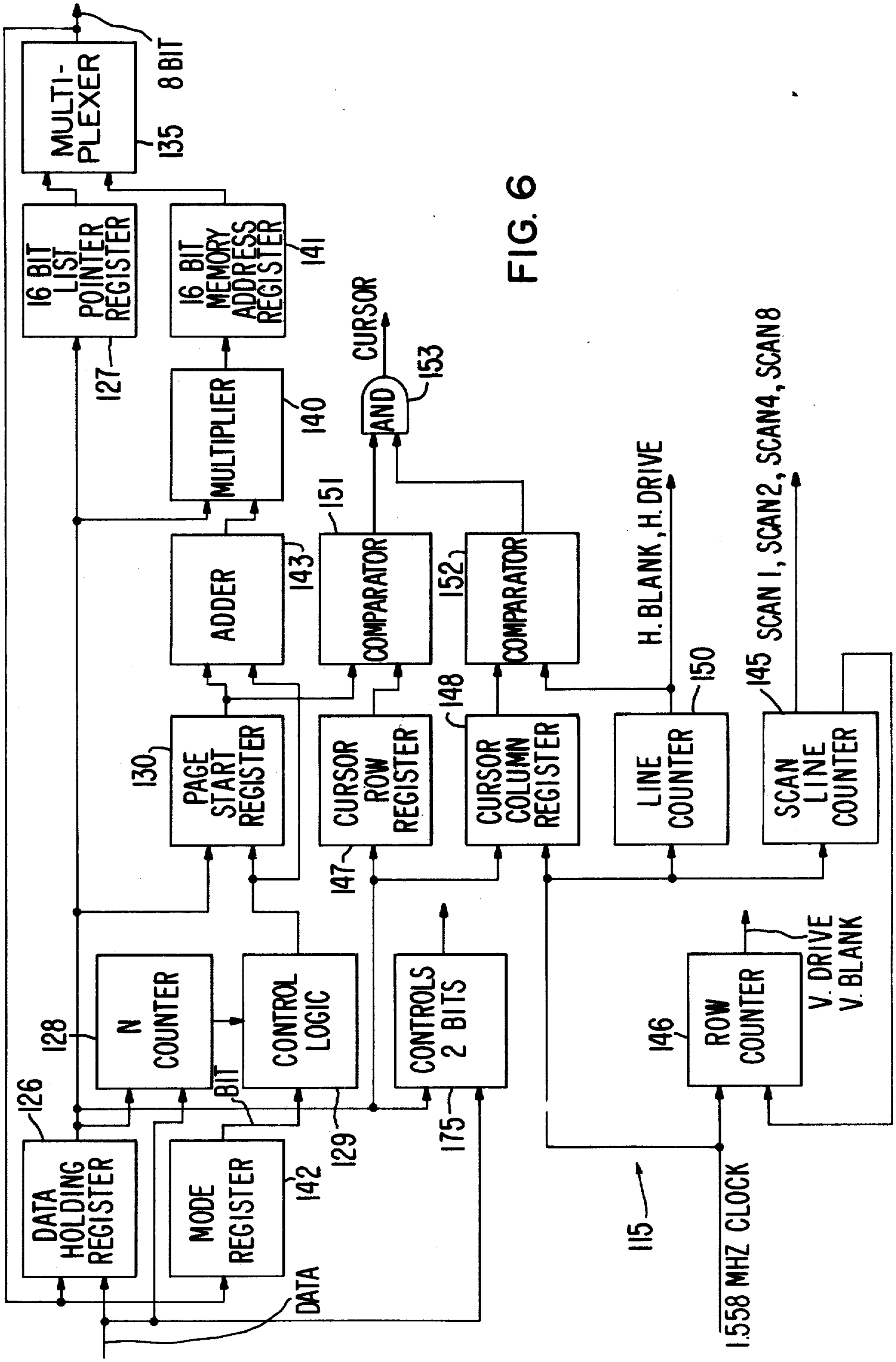
FIG. 6 is a schematic diagram of a direct memory access circuit employed in the microcomputer terminal system shown in FIG. 1.
Figure 7:
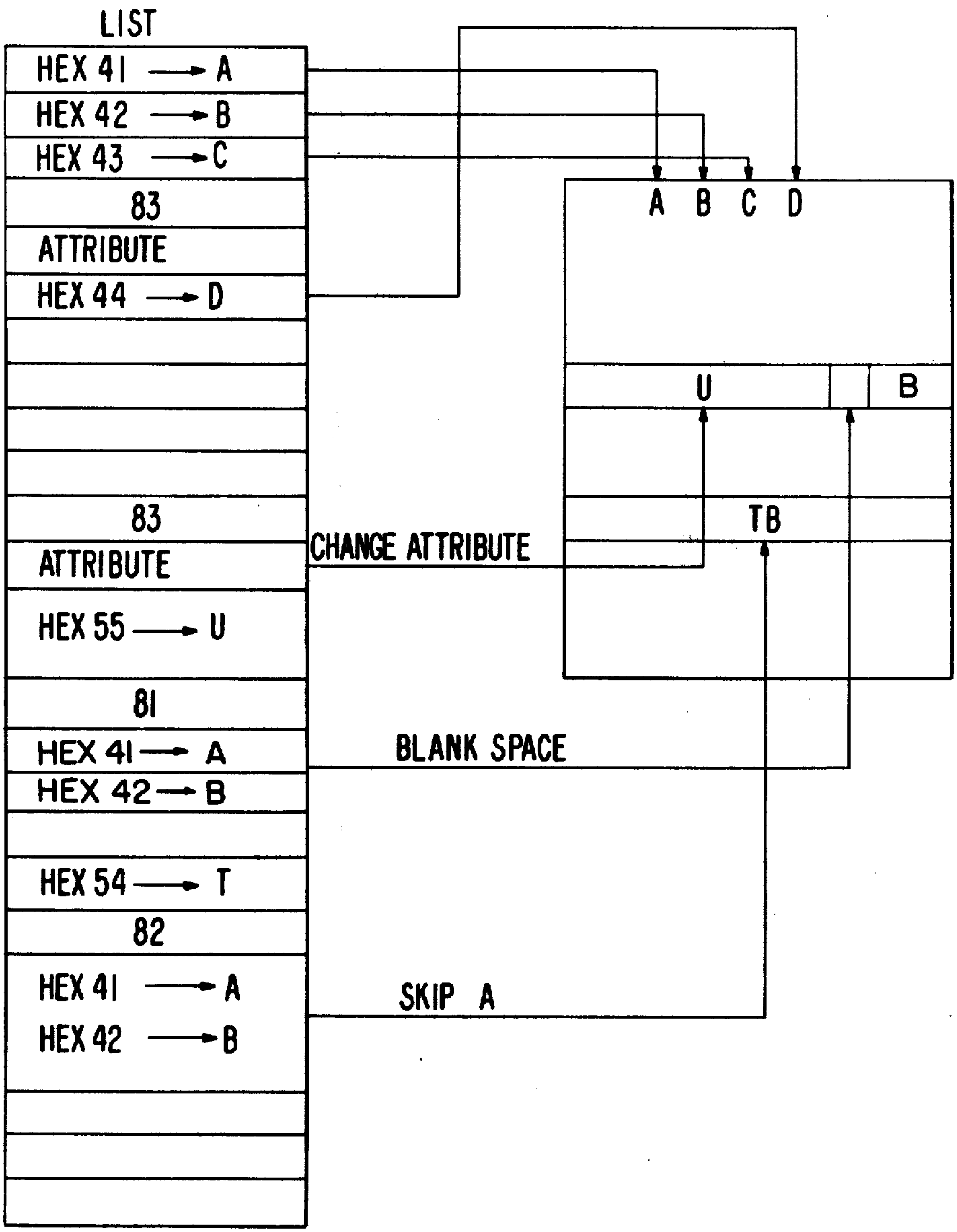
FIG. 7 is a diagrammatic illustration of attribute control codes employed in the microcomputer terminal system shown in FIG. 1.

Character clock pulses are also produced in the output of the latch circuit 60. Part of the horizontal line includes horizontal blanking. Eighty counts of the character clock pulses represent the visible line (80 columns) and the remaining 18 counts represent the horizontal blanking interval. The horizontal and vertical blanking circuits are incorporated in the direct memory access circuit 115 (FIGS. 3A and 6). The output of a row counter 146 (FIG. 6) is employed for vertical drive and vertical blanking, while the output of a line counter 150 is employed for horizontal blanking and horizontal drive.

Figure 8A:
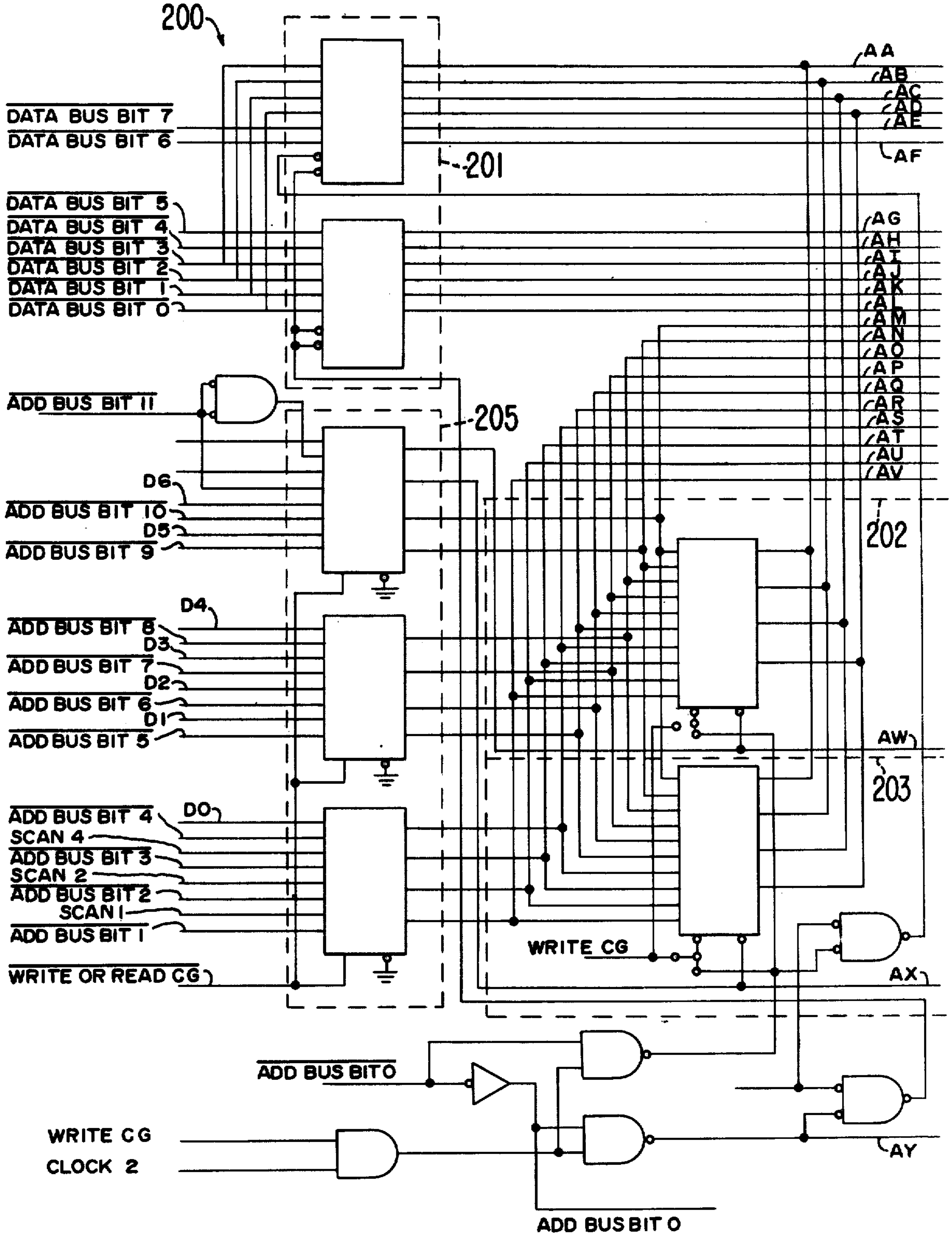
FIGS. 8A and 8B are a schematic diagram of a character generator employed in the microcomputer terminal system shown in FIG. 1.
Figure 8B:
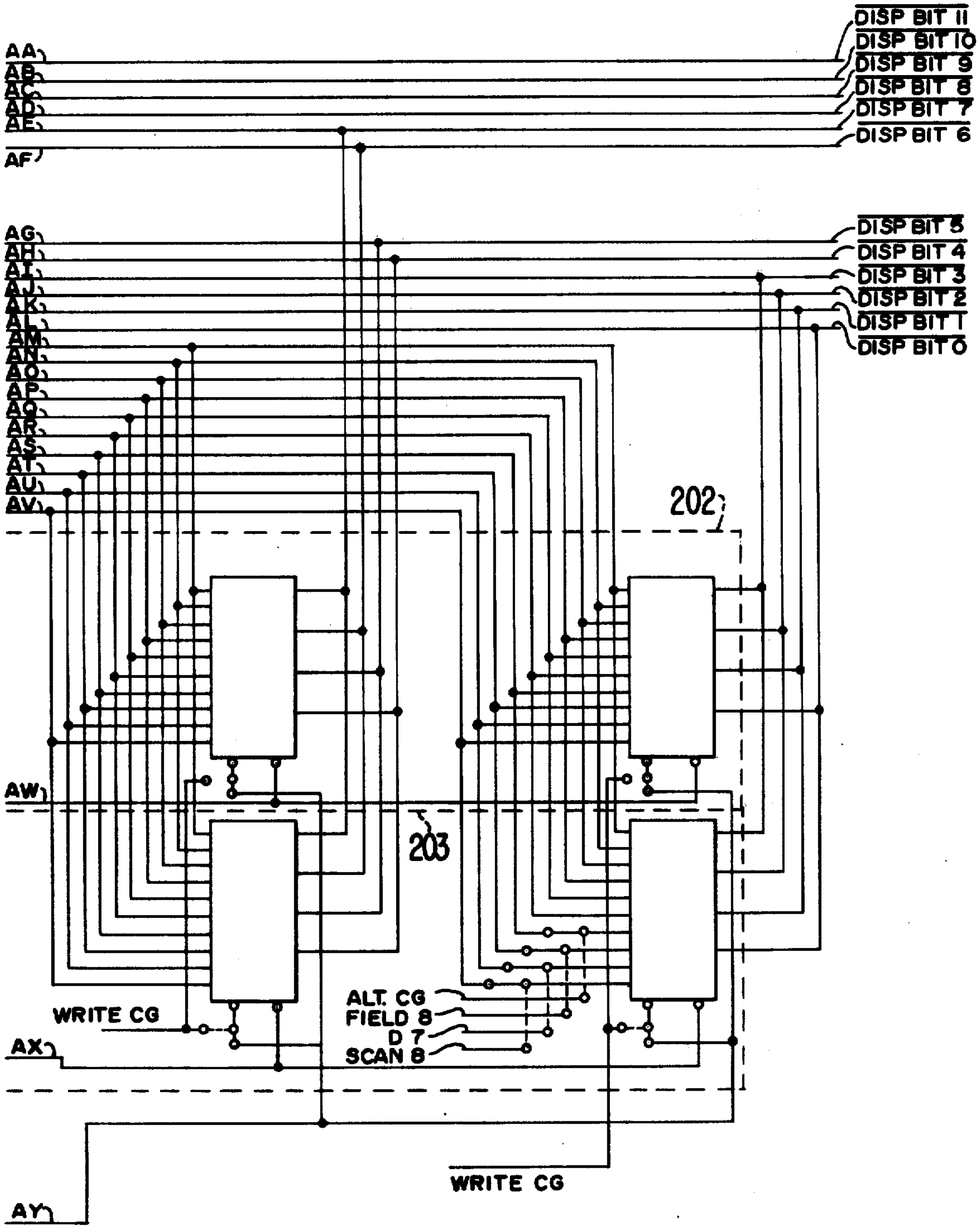

Ten horizontal lines make up each row of characters on the video display 12. The video circuit 19 indicates the row in which a particular line falls, and also which line of that row is being scanned. The horizontal blanking signal is divided by 10 in the line counter 150 which is in the direct memory access circuit 115. The output of a scan line counter 145 is used to drive the character generation circuitry 200 (FIGS. 8A and 8B). The overflow from the scan line counter 145 drives the row counter 146 which is incorporated in the direct memory access circuit 115. The row counter 146 is a divide-by-25 circuit which provides a continuous indication of the current display row. Twenty-five rows constitute one visible frame. The overflow from the row counter 146 is used to derive vertical drive and blanking signals.

The output of the latch circuit 60 is also applied to a ½ bit retimer circuit 70. Connected to the output of the latch circuit 60 and the ½ bit retimer circuit 70 is a 12 volt clock circuit 75, which produces $\phi$A clock pulses and $\phi$B clock pulses. The purpose of this arrangement is to adjust the timing of the $\phi$A clock pulses. The clock circuit 75 is connected to a voltage regulator circuit 76 for maintaining a level conversion for the voltage of the clock pulses applied to the driver circuits. The output of the voltage regulator circuit 76 is a 5-volt bias control. Additionally, an isolating gate driver circuit 80 is connected to the output of the latch circuit 60.

All input/output devices communicate with the microprocessor 13 through the system bus 14. The system bus 14 carries 8 parallel bits of data or instructions, 16 bits of memory address, internal commands and status signals, and allows any input/output devices direct memory access. The bus 14 also distributes power. The RAM memory 25 can be read and written into either by the CPU or any input/output device by requesting a memory cycle.

When the microcomputer 13 completes a data processing sequence, it writes an ASCII coded alphanumeric character and control information into the RAM memory 25 for display through shift registers 105 of a video refresh circuit 100 for refreshing data.

Figure 3B:
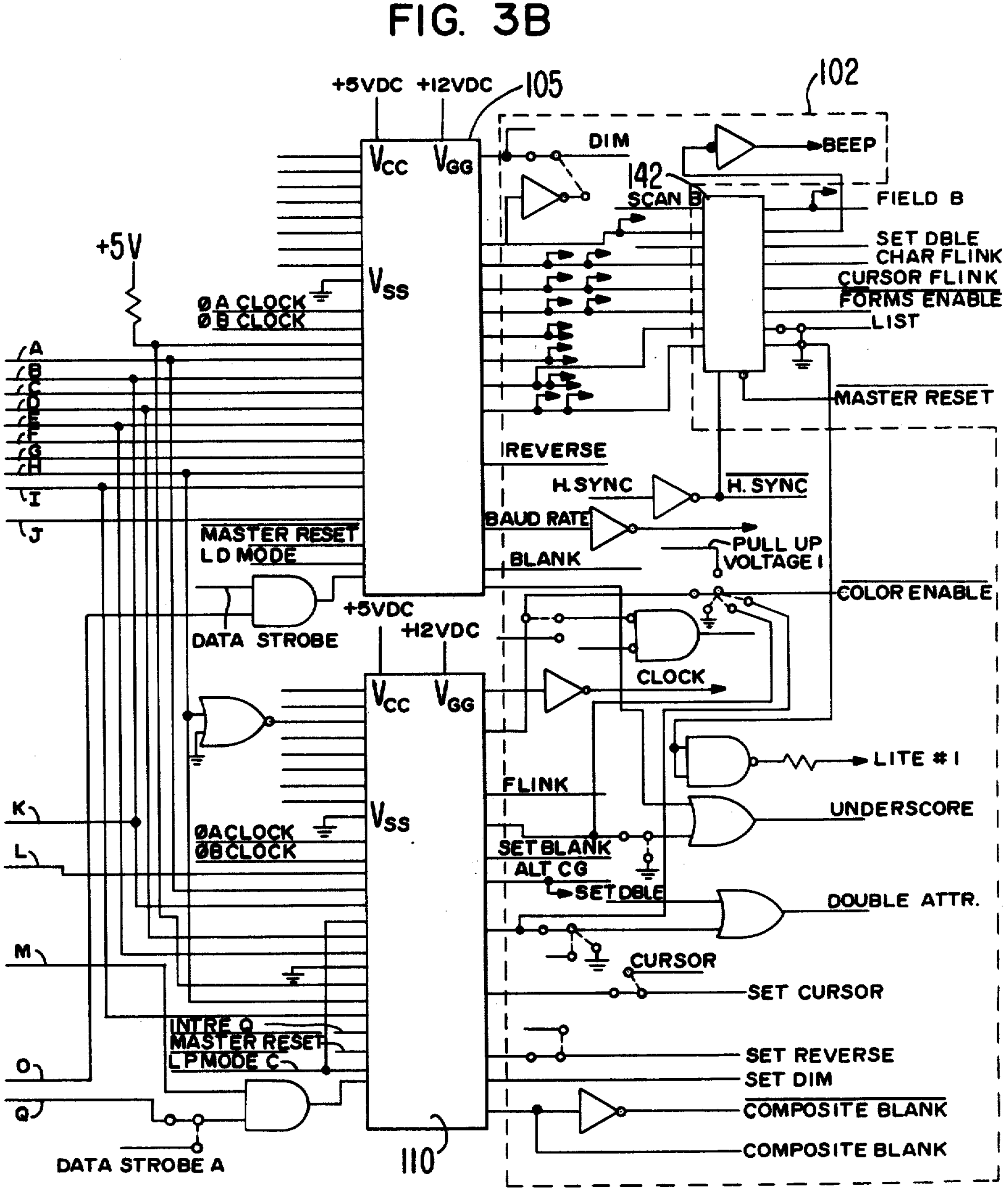

Illustrated in FIGS. 3A and 3B is the video refresh circuit 100, which is a part of the video circuit 19. The video circuit 19 reads information out of the RAM memory 25, converts the ASCII coded character into a video signal, and uses the control information to determine the location at which the character is to be displayed on the screen. These operations are well-known in the art and are disclosed in detail in U.S. Pat. No. 3,973,244.

To access any memory location for character refresh purposes, a 16-bit address is used. This address is provided by the direct memory access circuit 115 through 16-bit list pointer register 127 or 16-bit memory address register 141. When a key of the keyboard 11 is depressed, it causes the keyboard circuit 17 to output an 8-bit ASCII code. The code is stored at the keyboard input location in the RAM memory 25. The RAM memory 25 location is monitored by the microprocessor 13. If the entry is data character, it is displayed on the video display 12. The ASCII code is loaded by the microprocessor 13 into the video display section of the RAM memory 25 at the current cursor position.

RAM locations and other numerical quantities are expressed in hexadecimal notation. Every hexadecimal number is preceded by the letter X and is enclosed in apostrophes.

Figure 4:
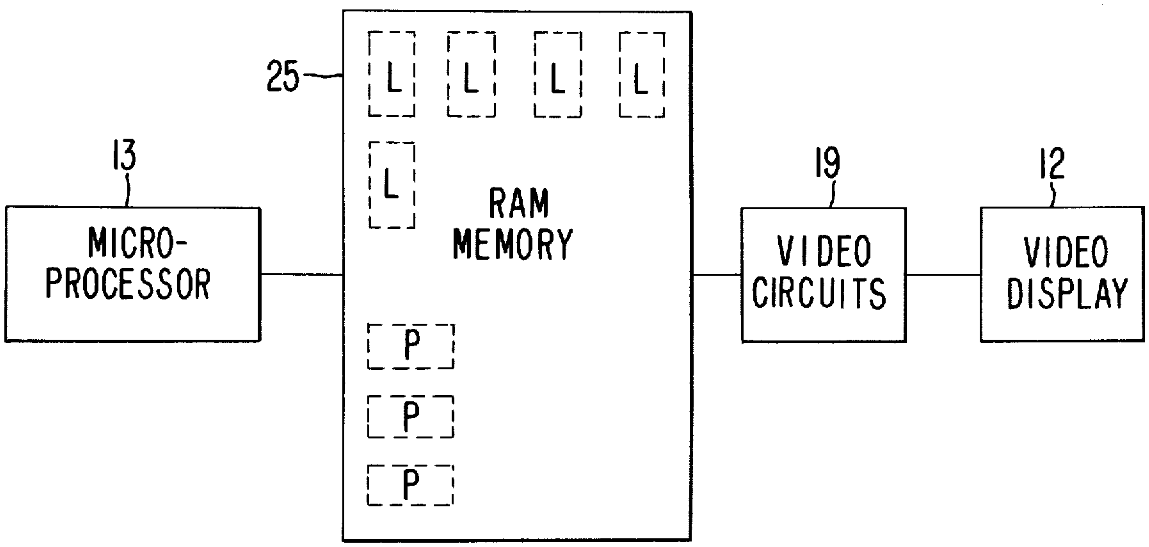
FIG. 4 is a diagrammatic illustration of the list mode operation for the microcomputer terminal system shown in FIG. 1.

The RAM memory 25 (FIG. 4) contains programs for execution by the microprocessor 13, data (displayable and non-displayable) and control information. The control information describes where in the memory 25 the displayable data resides, the positions on the video display 12 at which the data is to be displayed and the video attributes of the displayable data. Video attributes are the visual effects that can be achieved on the video display 12, such as blinking, reverse video, dim, et cetera. Toward this end, attribute shift registers 110 (FIG. 3) store the video attribute data for refreshing the video circuit 19.

The video circuits 19 automatically, and without support from the microprocessor 13, interpret the control information stored in the RAM memory 25 and operate the video display 12 to position the data at the designated location on the video display 12 together with the designated video attributes. This operation is performed each time the display is refreshed, which is generally 60 times per second. These operations are well-known in the art and are employed in the Zentec Microcomputer Terminal System 9003.

In the list mode operation of the present invention, the RAM memory 25 stores a list L (FIG. 5) and a plurality of data address pointers P. A list L is composed of contiguous blocks of information and each block contains information relating to a location of the segment of data to be displayed. The video circuit 19 reads a data address pointer P in a designated location of the RAM memory 25 within a list selected by a list address pointer PA. The list address pointer PA at the selected location points to the beginning of a designated list L. Within the list L, the data address pointer P points to a block of data to be displayed. The list address pointers PA are located at X'1006' and X'1007' in the memory 25.

Each list element consists of a starting address and a character count which define a field or series of characters in the memory 25 to be displayed. The length of the defined field may be less than or greater than the length of the 80 character line on the screen up to a maximum of 255 characters. Each element in the list L also contains a control character or data which further defines the display. By various coding in the control character or data, the video circuit 19 can effect the following operations:

1. Display the data as double width on the screen.
2. Automatically fill out the remainder of a partially defined line with blanks.
3. Go to the next element in the list for the remainder of a partially defined line.

On each refresh of the video display 12, the video circuit 19 progresses element by element through the list L generating the display as defined by the list L until a full screen (2000 characters including the 25th line) has been displayed. The video circuit 19 returns to the beginning of the list for the next refresh cycle. These functions are implemented by the direct memory access circuit 115.

During the list driven video process, the video circuit 19 examines the displayable data stream for special codes, i.e. X'80', X'81', X'82' and X'83' through a decoder circuit 125 (FIG. 3A). If any of these codes are encountered, the code itself is not displayed and does not take a space on the video display 12. It does, however, alter the action taken on the next character in the data screen. The modified actions are as follows:

X'80'—The succeeding character is displayed in the usual manner. It does, however, reserve a space in the data stream such that one of the other modifying codes can be subsequently inserted.

X'81'—Display the next character as a blank.

X'82'—The succeeding character is not displayed and does not occupy a space on the video display 12.

X'83'—Decode the succeeding character as a video attribute. The succeeding character is presented to the video attribute shift registers 110. It is not displayed and does not occupy a space on the video display 12.

These functions are implemented by hexadecimal code logic circuits 125 (FIG. 3A). Toward this end, the code logic circuit 125 includes a counter 155 which is an enabling circuit to enable the hexadecimal codes 80–83 to be read only when the hexadecimal codes are in the character display position in the memory 25. Additionally, the code logic circuit 155 includes NAND gate 156, NOR gate 157, NOR gate 158, AND gate 159, AND gate 160, and AND gate 161. These gates serve as decoding circuits to detect the presence of codes 80–83. The decoding circuits are strobed by a circuit including NOR gate 162, NAND gate 163, NOR gate 164, AND gate 165, and inverter 166. The strobing circuit strobes the decoder output into a latch circuit 167. Also included in the decoder circuit is a latch circuit 168, NOR gate 169, AND gate 170, AND gate 171 and OR gate 172.

Figure 5:
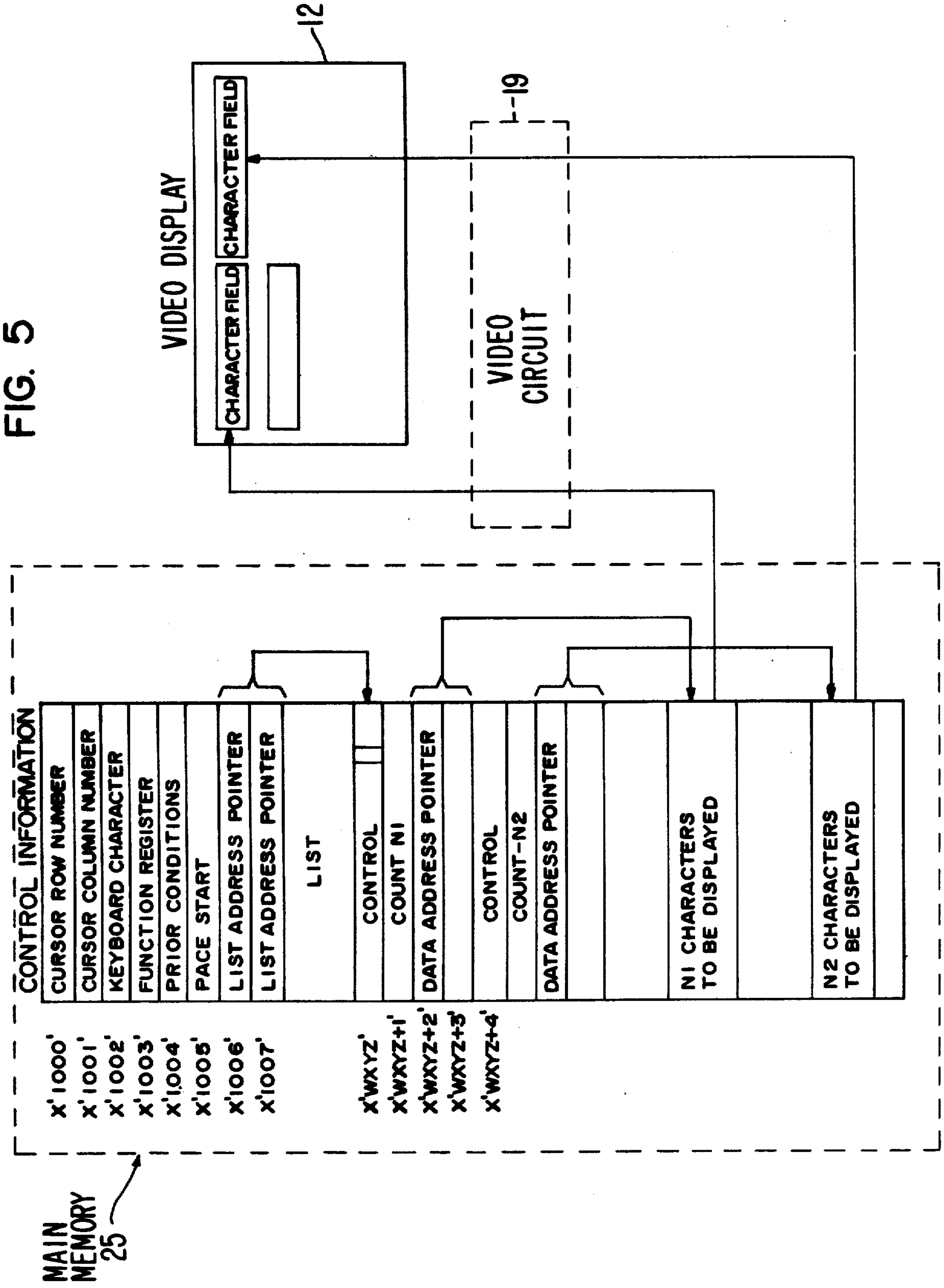
FIG. 5 is a diagrammatic illustration of the control information and lists employed in the microcomputer terminal system shown in FIG. 1.

The video circuit 19 reads a series of control characters once each video frame time down the list L (FIG. 5). The control character list L begins at location X'1000' and has the structure shown in FIG. 5. RAM memory 25 at locations X'1006' and X'1007' point to the list L. The list L has the structure shown in FIG. 5.

Each block of four bytes in the list L refers to a block of data to be displayed. The first byte at location X'WXYZ' has only two active bits. The first bit (bit 0) directs the display of the number of characters defined by the number located at X'WXYZ+1' and then fill in the rest of the row with X'20' if this bit is a zero. If this bit is a 1, it displays the number of characters defined at X'WXYZ+1', then it goes to the next 4 byte block in the list L and continues filling out the remainder of the row with that data. Bit one of the byte at X'WXYZ', if a zero, displays the data on the screen as 80 characters per row. If it is a 1, the data is displayed on the screen as 40 characters per row.

The second byte of the list L located at X'WXYZ+1' is the block length. The block length has a range from 0 to 255 of the display and control bytes, while the two bytes at X'WXYZ+2' and X'WXYZ+3' is the data address pointer P which points to the data to be displayed.

After the video circuit 19 has read and displayed the data designated by a 4 byte block, it reads the next 4 byte block for more data. The video circuit 19 continues to operate in this manner until the end of the video display is reached. Thereupon, the video circuit 19 resets to X'1000' to begin the next scan. Each 4 byte block gives block count plus the location of the data in the RAM memory 25. The data to be displayed is pointed to by the last two bytes of each 4 byte block data control block, and allows the use of all codes of the 8 bit data byte for displaying characters except X'80', X'81', X'82' and X'83'. These codes are control bytes which have been previously defined.

There are two cursor address registers 147 and 148 (FIG. 6) in the direct memory access circuit 115. At location X'1000' of the memory 25 is identified the cursor row number. At location X'1001' of the memory 25 is identified the cursor column number. The numerical values in the memory 25 are loaded in the cursor address registers 147 and 148 in the direct memory access circuit 115, which are read by the video circuit 19. The values contained at location X'1000' can range from X'00' to X'18' for the row address register 147 and the values contained at location X'1001' can range from X'00' to X'4F' for the column address register 148. Row addresses are extended to X'30' for page 2 video display. Row address X'01' corresponds to row 1 of the first video display page and column address X'00' corresponds to the first column on the left of the video display 12.

The cursor signal is taken from the output of an AND gate 153. One input to the AND gate 153 is derived from a comparator circuit 152. The other input to the AND gate 153 is derived from the output of a comparator circuit 151. The comparator circuit 151 compares the output of the page start register 130 and the cursor row register 147. The comparator circuit 152 compares the output of the cursor column register 148 and the line counter 150.

The memory 25 receives data from the keyboard 11 via the keyboard interface circuit 17. The keyboard input to the memory 25 is located at address X'1002'. The keyboard data is loaded asynchronously by the keyboard interface circuit 17 and is monitored by the microprocessor 13. The keyboard 11 is allowed to write any code other than X'FF' into the memory 25. After the microprocessor 13 reads a character code out of the location X'1002' at the memory 25, it writes X'FF' back into the same location. When the microprocessor 13 monitors the location X'1002' in the memory 25, it interprets X'FF' as the absence of a keyboard character. Any other bit combination is read and processed.

The function data stored in the memory 25 is located at X'1003' and is general purpose data. The page register 130 of the direct memory access circuit 115 stores the address of the video display section of the RAM memory 25, which appears at the top of the video display 12. This data is located at X'1005' of the memory 25.

The video display section of the RAM memory 25 stores one byte for every character displayed on the video display 12. Whenever a code is entered from the keyboard 11, the CPU processes that character and writes in the video display section of the RAM memory 25. It is read out periodically by the video circuit 19, transformed into a video signal and displayed on the video display 12. The CPU writes into the video display section as needed to alter the display image, but the video circuit 19 continuously reads it out.

In the video display section of the RAM memory 25, there is a space for a total of 1920 bytes of data representing 80 characters on each of the 24 display lines which may or may not be used depending on the number of blanks. An additional 80 bytes are reserved for the 25th line which identifies the current operating mode. One page of video display information occupies 2000 bytes of space in the RAM memory 25.

Any byte stored in the video section of the RAM memory 25 is interpreted by the video circuit 19 either as a data character or as a control code. If a byte is interpreted as a character data, it is displayed on the video display 12. If a byte is interpreted as a control code, it specifies the special display effect which applies to all following data. The control code can specify that all characters following are to be dimmed, displayed on a reversed background, et cetera.

A byte is a control code if it is X'80', X'81' or X'82'. A control code X'83' specifies special display effects for all data characters from that location until the end of the display, or until another control X'83' is encountered.

The attribute byte structure is as follows:

MSB 7,1—Double width character
MSB 7,0—Single width character
MSB 6,1—Alternate character RAM
MSB 6,0—Standard character RAM
MSB 5,0—Reserved for general use
MSB 4,1—Underscore
MSB 4,0—No underscore
MSB 3,1—Blank the following characters
MSB 3,0—Do not blank the following characters
MSB 2,1—Reverse
MSB 2,0—Normal
MSBI, 1—Blink the following characters
MSBI, 0—Do not blink the following characters
LSB 0,1—Dim
LSB 0,0—Bright Character data signals and control signals are read from the RAM memory 25 by the refresh circuit 100 (FIGS. 3A and 3B). Included in the refresh circuit 100 is the direct memory access circuit 115 and scan gate logic circuits 120. Also included in the logic control circuit 100 are the hexadecimal code logic circuits 125 (FIG. 3) for the list mode operation of the video refresh circuit 100. The direct memory access circuit 115 and the scan logic circuit 120 receive character data signals and control signals. The hexadecimal code logic circuit 125 receives the control signals from the scan logic circuit 120 for selecting the attribute function.

N bits from 0–255 are fed to a data holding register 126 (FIG. 6) of the direct memory access circuit 115. The N bits load into separate 16 bit registers 127 by way of the output of the data holding register 126. Additionally, the output of the data holding register 126 is applied to the counter circuit 128. The counter circuit 128 has its output connected to a control logic circuit 129. The output of the control logic circuit 129 is applied to the page start register circuit 130 and to an adder circuit 143 through the page start register circuit 130. The counter circuit 128 holds the count N in the RAM memory 25 and also counts the number of characters loaded into the shift register 105. A control register 175 holds 2 bits of data.

When the count is less than 80, the control bits are examined to seek out the next function. If the first bit is 0, the remainder of the display row is filled with blanks. Should the N count be 0, then the entire row is filled with blanks. When the N count is greater than 80, the succeeding row is filled with data. If N were 255, the rows are filled with data until the count is exhausted. The remainder of the last row is filled with blanks.

When the control bit is a 1, the data characters are displayed on the display screen 12 until the count is exhausted. However, the remainder of the row is not filled out with blanks. At this time, there is a return to the list to pick-up the next four bytes. The succeeding four bytes instruct what to do with the succeeding segment of data.

If the second control bit is a 0, the normal procedure of 80 characters for each row is followed. If the second control bit is a 1, double width characters are displayed on the screen 12.

A multiplexer 135 (FIG. 6) is connected to the output of the 16 bit registers 127 and 141, and serves as a switching apparatus. A mode register 142 applies a list or no list signal to the control logic circuit 129. If a list mode signal is applied to the control logic circuit 129, the page start register 130 and the adder 143 are disabled. A 16 bit memory address register 141 stores the address list pointer values for application to the multiplexer 135. These values are received by way of multiplexer 140 and data holding register 126 from the data address pointers in the list L. The output of the multiplexer 135 is an address applied to the memory 25 to read the character at the address location to be loaded in the shift register 105 (FIG. 3B).

During the list mode operation, the hexadecimal code logic circuit 125 monitors the data loaded into the shift registers 105 and detects various codes. There are four different codes to be detected by the hexadecimal code logic circuits 125, namely: hexadecimal 80, hexadecimal 81, hexadecimal 82 and hexadecimal 83. When the hexadecimal code logic circuits 125 detect a hexadecimal code 83, the video display 12 does not use a character space on the display screen 12. The following byte is an attribute byte. The attribute byte does not occupy a space on the display screen of the video display 12 and is loaded into the shift registers 110 (FIG. 3B).

When the hexadecimal code logic circuits 125 detect a hexadecimal code 83, an attribute selection is made through the shift registers 110. The succeeding detection of a hexadecimal code 83 ends the attribute selection and selects another attribute. If the hexadecimal code logic circuits 125 detect a hexadecimal code 80, there is no display for that space on the video display 12. The space is reserved for general purpose operations. A detection of a hexadecimal code 81 by the hexadecimal code logic circuits 125 effects the blanking of the following character on the video display 12. It is only the first succeeding character that is blanked. Lastly, a detection of the hexadecimal code 82 by the hexadecimal code logic circuits 125 effects the hiding or skipping of the following character on the video screen 12. The character information is made available to the operator through the video display 12.

From FIG. 3B, it is to be observed that the character data signals advance through the shift registers 105 in parallel with the advancement of the attribute control signals through the shift registers 110. In this manner, attributes are shown in the video screen 12 without occupying any additional space on the screen of the video display 12 for attributes. The row counter 146 (FIG. 6) counts individual rows of the video display 12 so that vertical retrace can be triggered at the end of the 25th row. Suitable buffer drive circuits 101 and 102 (FIGS. 3A and 3B) are provided for isolation.

The ASCII codes from the shift registers 105 are applied to the character generator circuit 200 (FIGS. 8A and 8B) along with the scan line counts from the scan line counter 145 of the direct memory access circuit 115. The combination of the ASCII code and the scan line counts form an address through tri-state drivers 205. The address is applied to the soft character generator read-only memory circuits 202 and 203 to access the character bit pattern. The character generator 200 is loadable by the CPU and readable by the CPU. Multiplexer 201 holds data from the CPU before loading the read-only memory circuits 202 and 203. The character generator 200 is 12 bits wide. The first 128 characters of the ASCII code are contained in the memory circuit 202 and the second 128 characters are contained in the memory circuit 203. While the memory circuits 202 and 203 are referred to herein as read-only memory, they may be programmable random access memories. The character generator not only handles a large number of characters, but can be read for foreign language functions.

Figure 9A:
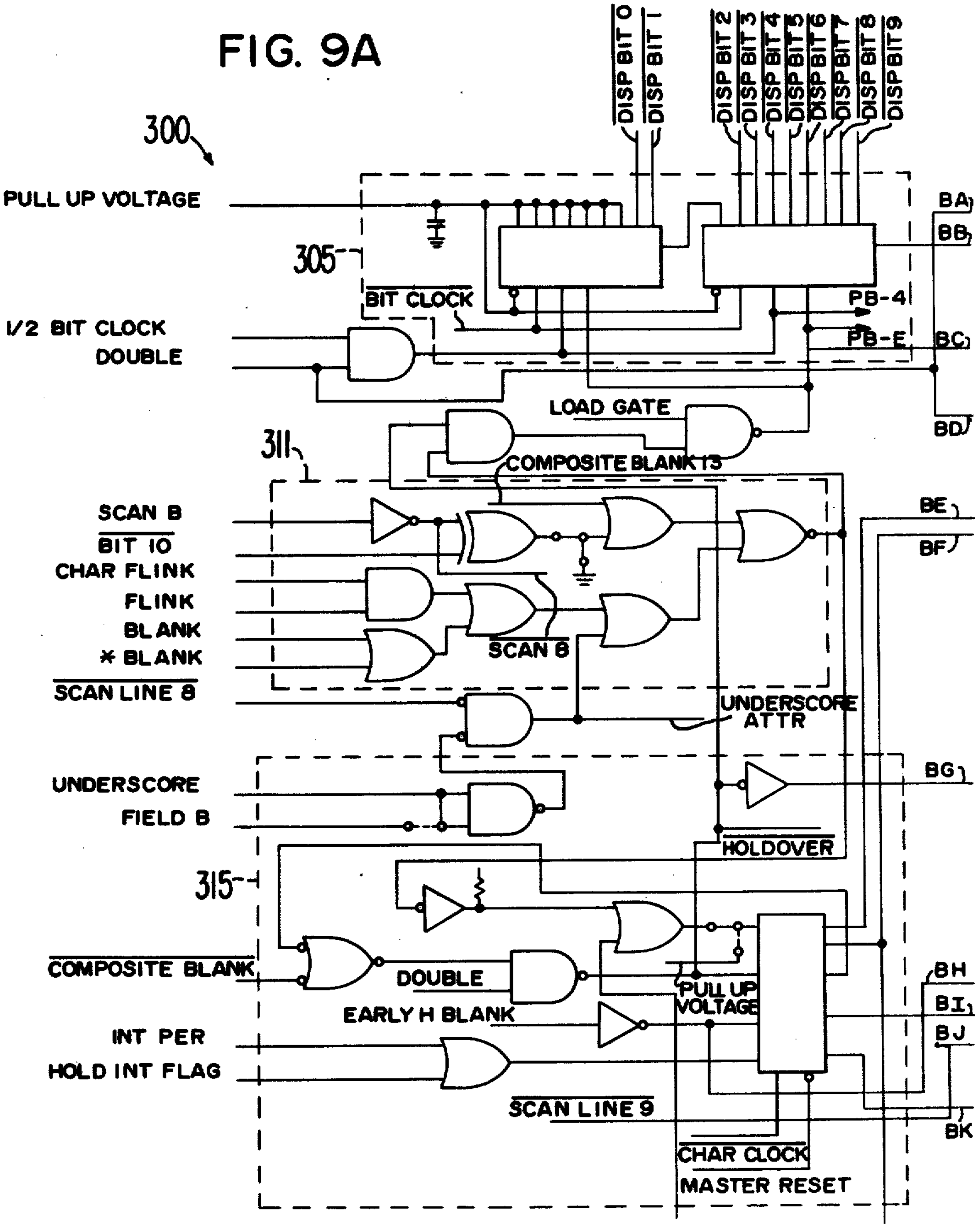
FIGS. 9A and 9B are a schematic diagram of a video logic circuit employed in the microcomputer terminal system shown in FIG. 1.
Figure 9B:
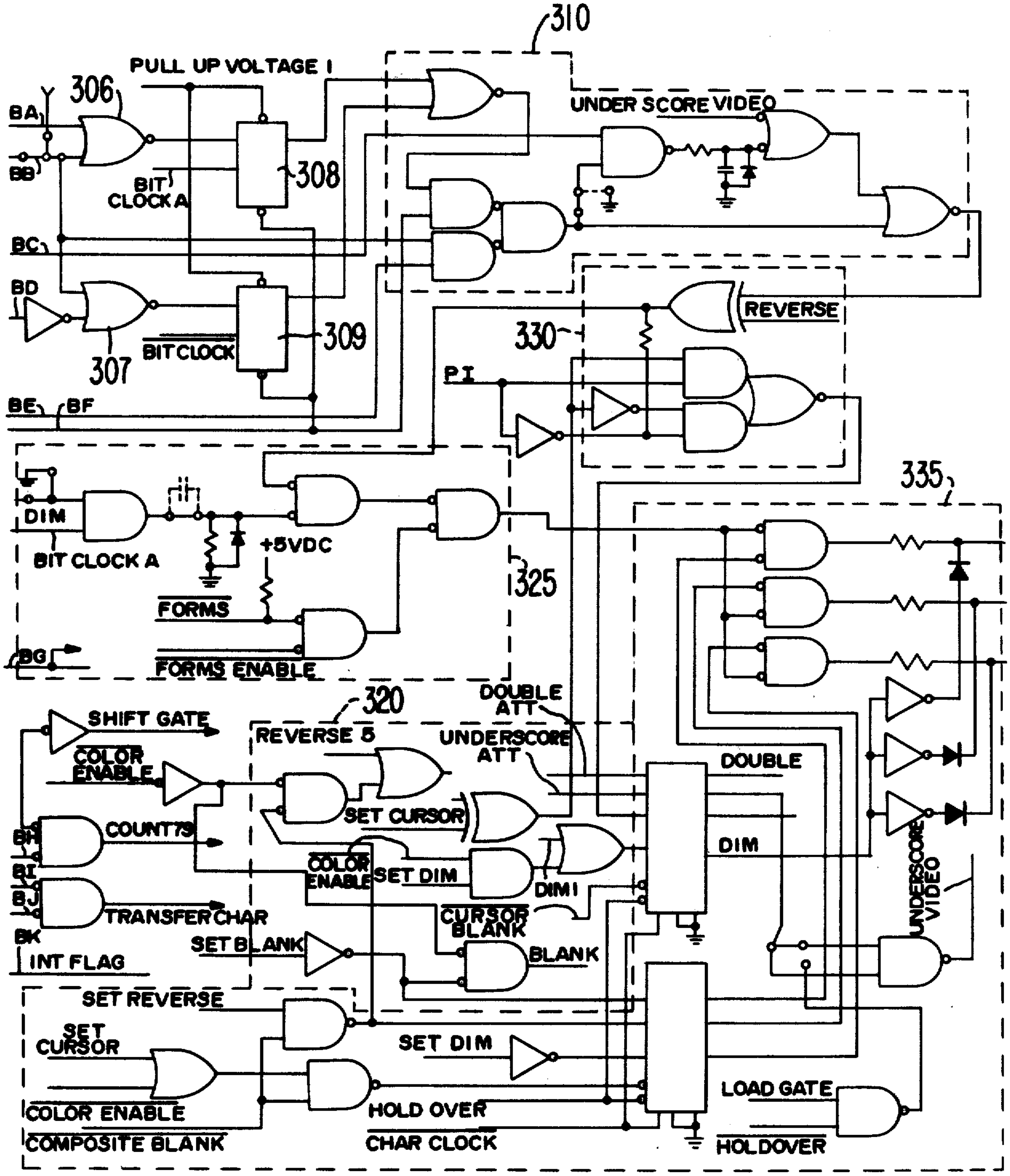

The output of the character generator 200 is applied to the video logic circuit 300 (FIGS. 9A and 9B) to be translated from a parallel bit pattern to a serial bit pattern for application to the video display 12. The shift registers 110 supply attribute information which is applied to the video logic circuit 300. In the video logic circuit 300, the attribute information is reclocked, retimed and used to modify the video serial bit stream to create the screen attributes. Toward this end, the video logic circuit 300 includes parallel to serial shift registers 305.

The output of the parallel to serial shift registers 305 is applied through NOR gates 306 and 307 to a single half-bit shift register 308 and a double half-bit shift register 309. The output thereof is applied to an underscore attribute circuit 310 for underscoring character data when the underscore attribute is for display on the visual display 12. Blanking control over the video display 12 is provided by a blanking control circuit 311. The output of a timing and control circuit 315 is applied to a decoding, mixing and latching circuit 320. A circuit 325 adds externals on the video signal to be displayed. For reversing the polarity of video signals for the reverse mode, a circuit 330 is provided. The output of the video logic circuit 300 is applied to the video serial bit stream to create the screen attributes through the attribute driver circuit 335.

I claim:

1. Apparatus for refreshing a video display comprising:

(a) a memory for storing list address pointers, lists, and character data, each of said lists including a data address pointer;

(b) a video circuit coupled to said memory for reading a list address pointer at a designated location in said memory to be pointed to one of said lists in said memory and to read the data address pointer of said one list to be pointed to the storage location of character data; and (c) a video display coupled to said video circuit for displaying the character data to which said video circuit was pointed.

2. Apparatus for refreshing a video display as claimed in claim 1 wherein said video display has refresh cycles and wherein each of said lists include successive elements one of which is the data address pointer and wherein said list address pointer points said video circuit to the beginning of the list to which it was pointed, said video circuit being arranged to read the list to which it was pointed element-by-element and to return to the beginning of the list to which it was pointed for the beginning of the succeeding refresh cycle.

3. Apparatus for refreshing a video display as claimed in claim 2 wherein each of said lists stored in said memory include the following elements in addition to the data address pointer: a character count and control data.

4. Apparatus for refreshing a video display as claimed in claim 3 and comprising a microprocessor for writing character data to be stored in said memory and for writing control data on a list stored in said memory, said control data supplying the location in said memory of said character data, the location on said video display for displaying said character data, and the attribute data for said character data, said video circuit reads the character data out of said memory and converts the character data into a video signal for application to said video display, said video circuit reads said control data out of said memory to apply signals to said video display to position the character data at the designated location on the video display and to display the character data on the video display with the designated video attribute.

5. Apparatus for refreshing a video display as claimed in claim 4 wherein said video circuit comprises a direct memory access circuit for accessing any location in said memory for character data and for control data during each refresh cycle, said circuit includes data shift registers coupled to said direct memory access circuit for storing character data to refresh the video circuit with character data during each refresh cycle, said video circuit including a logic circuit coupled to said direct memory access circuit for detecting a code in said control data, and attribute shift registers coupled to said logic circuit for storing attribute data to refresh said video circuit with attribute data during each refresh cycle.

6. Apparatus for refreshing a video display as claimed in claim 5 wherein said character data advances through said data shift registers in parallel with the advancement of attribute data through said attribute shift registers for displaying attributes on said video display without occupying additional space on said video display for attributes.

7. Apparatus for refreshing a video display as claimed in claim 6 wherein said control data includes various codes and wherein said video circuit controls display operations on said video display in accordance with the code read in the control data.

8. Apparatus for refreshing a video display as claimed in claim 7 wherein said video circuit includes a code logic circuit for detecting a code in said control data and emitting signals to control display operations on said video display in accordance with the code detected by said code logic circuit from the control data.

9. Apparatus for refreshing a video display as claimed in claim 4 wherein said video circuit is a refresh circuit for refreshing the video circuit with character data and control during each refresh cycle.

10. Apparatus for refreshing a video display as claimed in claim 9 wherein said refresh circuit includes a direct memory access circuit for accessing character data and control data from a designated location in said memory.

11. Apparatus for refreshing a video display as claimed in claim 10 wherein said refresh circuit includes a scan logic circuit coupled to said direct memory access circuit and a code logic circuit coupled to said scan logic circuit for detecting a code from the control data for selecting an attribute function.

12. Apparatus for refreshing a video display as claimed in claim 11 wherein said refresh circuit includes data shift registers coupled to said direct memory access circuit for storing character data to refresh the video circuit with character data during each refresh cycle and attribute shift registers coupled to said logic circuit for storing attribute data to refresh said video circuit with attribute data during each refresh cycle.

13. Apparatus for refreshing a video display as claimed in claim 12 wherein said character data advances through said data shift registers in parallel with the advancement of attribute data through said attribute shift registers for displaying attributes on said video display without occupying additional space on said video display for attributes.

14. Apparatus for refreshing a video display as claimed in claim 13 wherein said direct memory access circuit includes a counter circuit for counting data bytes loaded into said data shift registers.

* * * * *